United States Patent [19]
Mancini et al.

[11] Patent Number: 4,616,547
[45] Date of Patent: Oct. 14, 1986

[54] IMPROVISER CIRCUIT AND TECHNIQUE FOR ELECTRONIC MUSICAL INSTRUMENT

[75] Inventors: George M. Mancini, E. Setauket, N.Y.; Rudolph A. Huber, Trossingen, Fed. Rep. of Germany

[73] Assignee: Matth. Hohner AG, Trossingen, Fed. Rep. of Germany

[21] Appl. No.: 696,927

[22] Filed: Jan. 31, 1985

[30] Foreign Application Priority Data

Feb. 2, 1984 [DE] Fed. Rep. of Germany ......... 340355

[51] Int. Cl.$^4$ .................... G10H 1/40; G10H 7/00
[52] U.S. Cl. ................. 84/1.03; 84/DIG. 12; 84/1.24
[58] Field of Search .............. 84/1.03, 1.24, 1.01, 84/DIG. 12

[56] References Cited
U.S. PATENT DOCUMENTS

| | | | |
|---|---|---|---|
| 4,148,239 | 4/1979 | Oya et al. | 84/1.03 |
| 4,208,938 | 6/1980 | Kondo | 84/1.03 |
| 4,307,644 | 12/1981 | Aoki | 84/DIG. 12 |
| 4,454,796 | 6/1984 | Inoue et al. | 84/DIG. 12 |

Primary Examiner—Arthur T. Grimley
Assistant Examiner—David Warren

[57] ABSTRACT

An automatic improvisation circuit for an electronic musical instrument. "Short" rhythm and "short" melody data is read from memories under the control of random number generators, and this rhythm amd melody data is combined and varied as a function of preselected basic rhythms and tonics, and in accordance with rules, to improvise an accompaniment.

13 Claims, 7 Drawing Figures

IMPROVISER CIRCUIT AND TECHNIQUE FOR ELECTRONIC MUSICAL INSTRUMENT

BACKGROUND OF THE INVENTION (1) Field of the Invention

The present invention relates to electronic musical instruments and particularly to keyboard-type instruments wherein an accompaniment may be automatically improvised by the instrument. More specifically, this invention is directed to the improvisation of a musical accompaniment wherein, in response to the selection of a basic rhythm and at least a basic note, "defined" chords which employ the basic note as the root are generated and these chords are matched to the tonality of the selected rhythm and root. Accordingly, the general objects of the present invention are to provide novel and improved apparatus and methods of such character.

(2) Description of the Prior Art

The present invention is particularly well-suited for use in key-actuated electronic musical instruments, i.e., electronic organs. Many types of such instruments are commercially available and, commensurate with advances in computer science, such instruments are becoming increasingly versatile. Thus, in recent years, the sound composition to be reproduced has been digitally synthesized and the instruments include chord recognition circuits which detect a tonality actually played and generate therefrom an accompaniment comprising filling notes commensurate with the tonality, i.e., with the root note, selected by the musician. An example of a state-of-the-art electronic organ may be seen from German Patent Specification No. 30 23 578.

The accompaniment generated by prior art electronic musical instruments, as exemplified by the above-referenced German Patent Specification, is comparatively uncomplicated and meets only limited musical requirements. As is well-known, a proficient musician often improvises on a given theme, i.e., the well-trained player is able to modify a theme in accordance with certain musical rules such that he will play "mating" chords commensurate with selected notes. In the course of such improvisation, the musician may also "solve" the "mating" chords, vary the tempi, etc. Prior art electronic musical instruments have lacked circuitry which would enable the amateur musician to simulate the effect of the improvisation of the well-trained musician.

SUMMARY OF THE INVENTION

The present invention overcomes the above-discussed deficiency of the prior art by providing a novel technique and circuit which permits an electronic musical instrument to produce an automatic improvisation.

In accordance with the present invention, musical form elements, i.e., rhythm patterns and tone sequence patterns, are stored. In addition, combining rules for the rhythm and tone sequence patterns are stored. The allowed combination of rhythm and tone sequence patterns selected is randomly varied, in an attempt to obtain a large range of musical variations, in accordance with data, specifically a basic rhythm and tonality, chosen by the musician.

In apparatus in accordance with the present invention, tone duration and tone pitch data are stored in memories and randomly read-out. Apparatus in accordance with the present invention includes command signal generator means which receives the data read from the memories under addresses generated by random address generators and, in response to such data, produces signals commensurate with tones having pitches commensurate with the read-out tone pitch data in a rhythm commensurate with the read-out tone duration data. The apparatus of the invention operates under the control of means for generating input signals commensurate with at least a basic rhythm and at least a root note of a selected tonality, these input signals being variable in response to the desires of the player of the instrument and determining the data to be read from the memories.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which.

DESCRIPTION OF THE DISCLOSED EMBODIMENT

Figure 1:
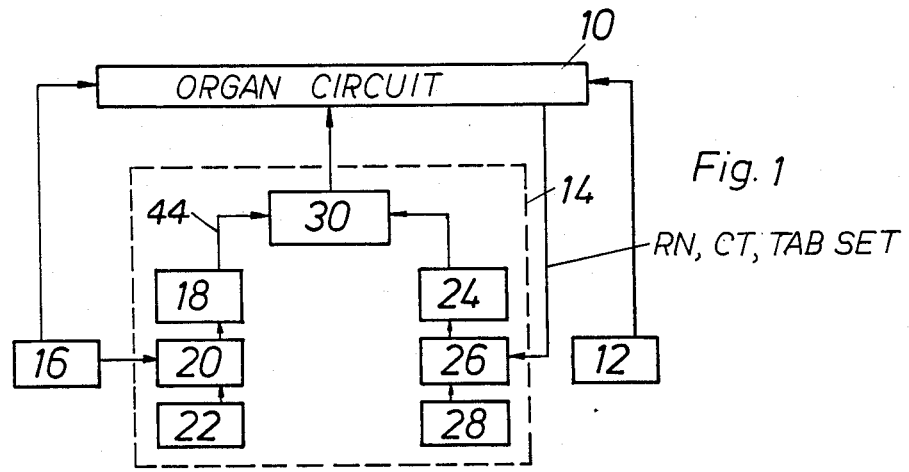
FIG. 1 is a functional block diagram of an electronic musical instrument in accordance with a first embodiment of the present invention.

Before describing the hardware and operation of the disclosed embodiment of the present invention, it is to be noted that the invention may employ components of the apparatus disclosed in U.S. Pat. No. 4,399,731, the disclosure of which is hereby incorporated by reference. U.S. Pat. No. 4,399,731 is directed to apparatus for use in the teaching of music. This apparatus includes a first memory which holds data representative of certain acoustic frequencies, and the stored data is read from the memory under the command of addresses generated by a random address generator. Accordingly, the sequence of notes commensurate with the data read from the memory does not follow a predetermined rule or pattern. The patented apparatus also includes a decision circuit which compares the data read from the memory, i.e., the actual pitch, with the pitch of the immediately preceding note in order to determine whether certain selection criteria are met. The selection criteria are manually chosen in accordance with progressing skill of the pupil. Once a pitch has been found "admissible", it is preliminarily stored in a further memory and a certain tone duration is allocated thereto. In order for this to be accomplished, data commensurate with tone durations are stored in a third memory and are also read therefrom under the command of the output signals produced by a random address generator. Thus, a group of successive tone durations which add up to a measure or a fraction thereof are read in a sequence in order to achieve at least a measurewise setup of the generated tones. The musical representation of the data commensurate with two, three, or four measures, produced by the patented apparatus, will be printed, displayed on a screen or transduced into audible information.

For purposes of explanation, it will be presumed that the present invention is incorporated into an electronic organ which has two manuals, i.e., two keyboards. Such an organ has input elements or stops which enable the selection of a basic rhythm such as, for example, "Waltz", "Tango", "Rock-n'Roll", etc. The selected rhythm is, in prior organs, produced via the analog acoustic output of the organ in the form of sequence patterns of percussion sounds.

The "improviser" of the present invention is responsive to the selection of one of the basic rhythms in a two-fold manner. Firstly, certain tone duration data may be disabled. For example, trioles are forbidden in the "rock-n-roll" rhythm. Secondly, the probability with which certain tone duration data are addressed may be varied.

The input of at least a basic note is interpreted by the "improviser" of the present invention to be the root of a major tonality. This basic note or root may, for example, be selected by the player by means of a key on the lower manual. The "improviser" will then utilize only those notes of the total of producable notes which, in accordance with common harmony tradition, result in "defined" chords in this root or which, as a function of the selected basic rhythm, match the respective tonality.

If a plurality of keys on the lower manual are actuated by the player, the respective chord is determined therefrom for the improvisation. In the subsequent periods or measures, or fractions thereof, the chord is modified in accordance with the common, i.e., accepted, rules of composing by retrograding, inverting, etc. in a manner very similar to the technique which would be practiced by a skilled human improviser. The modification results, in part, from the functioning of selection logic which operates on data read from a tone pitch data memory. The selection logic causes a sequence of "sounds" read from the memory, under the command of a random address generator, to be produced rather than a totally unpredictable reading of the addressed tone pitch data. Thus, the selection logic imposes, on the improviser, tone sequence patterns to which certain probabilities are allocated, and these probabilities in turn may be subject to variation depending upon the selected basic rhythm.

With reference now to FIG. 1, an "organ circuit", is indicated at 10. The organ circuit 10 comprises all usual sound generation and sound reproduction means of any known state-of-the-art electronic musical instrument, particularly an instrument which utilizes digital synthesis of sound. The organ circuit 10 thus will generate tones or notes under control of the keys which are manipulated by the musician, the timbre of the tones being determined by the player by the appropriate setting of stops. The improviser of the present invention is indicated generally at 14. A first control input to improviser 14 will be derived from the lower manual 12 of a two-manual instrument by the organ circuit as will be described in greater detail below. The improviser 14 also receives, as a second control input, an output signal, i.e., a "metronome clock" signal, provided by a basic rhythm generator 16. As briefly discussed above, the instrument will include means by which the player may select a basic rhythm accompaniment, and data commensurate with the selected rhythm will be outputted from the rhythm generator 16 and delivered to improviser 14. The manual 12 will provide ON/OFF commands to the tone generators included in organ circuit 10 and such commands are similarly delivered to organ circuit 10 by the improviser 14.

The improviser 14 comprises a tone duration control which includes a tone duration data memory 18. A selection logic circuit 20 is associated with memory 18 and, in the manner to be described below, controls the addressing of memory 18 by the output of a random address generator 22. The improviser 14 also includes a tone pitch control which includes a tone pitch data memory 24, associated selection logic 26 and a further random address generator 28. The outputs of the tone duration and tone pitch controls are combined as indicated at 30 to produce the ON/OFF commands delivered from improviser 14 to organ circuit 10. Thus, in the manner to be discussed below, the reading of tone duration data from memory 18 is controlled by the pre-set basic rhythm, i.e., the output signal produced by rhythm generator 16, and the tone pitch data read from memory 24 is effected by the key or keys operated on the lower manual 12 via the organ circuit 12.

Figure 2:
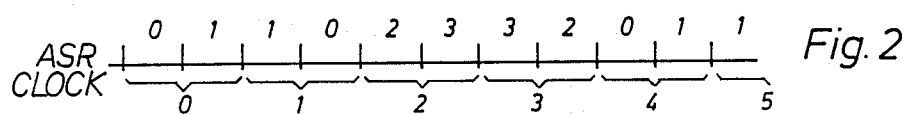
FIG. 2 is a schematic representation of a preferred sequence of rhythm patterns produced by the embodiment of FIG. 1, particularly by the subsystem of FIG. 3, over several measures.
Figure 3:
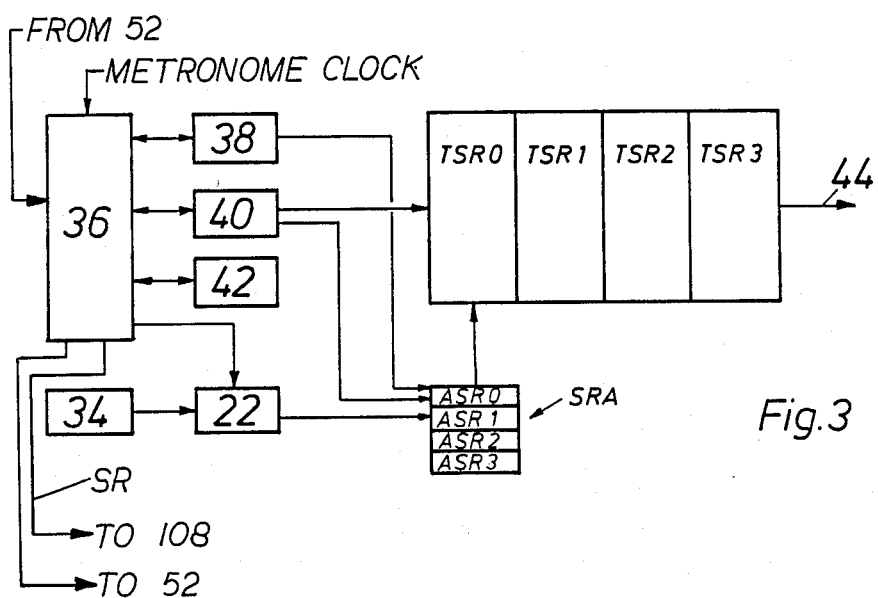
FIG. 3 is a functional block diagram of the tone duration, i.e., rhythm pattern, data selection circuit of the embodiment of FIG. 1.

Referring now jointly to FIGS. 2 and 3, the manner in which the temporal events of the improvisation are generated will be explained. The circuitry shown functionally and schematically in FIG. 3 comprises a part of the tone duration control of FIG. 1 and generates command signals commensurate with "tone on", i.e., corresponding to "key struck", and "tone off", corresponding to "key released". The outputs of the tone duration control of FIG. 3 do not directly effect the actual pitch of the notes to be sounded.

Continuing to discuss the circuitry of FIG. 3, in the disclosed embodiment of the present invention it is assumed that eight (8) successive measures are always formed of memorized "rhythm short-patterns" or, briefly, "short rhythms". Each short rhythm has the length of a half measure. These short rhythms are grouped in sequences each comprising two measures. The short rhythms comprising each group are interrelated in accordance with a scheme, as hereinafter explained, and set up such that "matching rhythms" in the style of Western musical tradition permit an improvisation having a broad range of variation yet having order principals which can be recognized by the listener.

The circuitry depicted in FIG. 3 employs four (b 4) individually addressable memories TSR0, TSR1, TSR2 and TSR3. Digital data commensurate with the relative ON/OFF intervals for each half measure of two (2) successive measures is stored in these memories. The shortest interval unit represented by one (1) bit corresponds to 1/48 of one measure or one full note. The memories TSR0, TSR1, TSR2 and TSR3 are addressed by an address register which is indicated generally at SRA. Two (2) of the four (4) addresses will be determined by the output signal of the random address generator 22, namely the addresses ASR0 and ASR1. The rhythm patterns stored in the four (4) memories are not arbitrary. Thus, memories TSR2 and TSR3 contain data commensurate with "response short rhythms" which "mate" with "question short rhythms" which are stored at corresponding addresses in memories TSR0 and TSR1, respectively. FIG. 2 schematically illustrates the succession of addressing and it may be seen that the enchainment is arbitrary.

As noted above, short rhythms are stored in memories TSR0, TSR1, TSR2 and TSR3. Actually, a plurality of short rhythms are stored for each basic rhythm. Thus, by way of example only, each of the four (4) memories may hold sixteen (16) short rhythms. It is to be noted that a plurality of basic rhythms may have the same measure, for example 2/4 measure, and a plurality of short rhythms, with the same measures assumed, may accordingly be utilized for several basic rhythms. This, however, is not compulsory. It is further to be noted that in the embodiment being described not all of the short rhythms utilizable in a selected basic rhythm will be read-out under control of the random address generator 22 with the same probability. Rather, the addresses produced by the address generator 22 are weighted, i.e., will occur with different probabilities. Thus, the address generator 22 is coupled to a weighting circuit 34 in which the probabilities for the random selection of the addresses AS are tabulated. Alternatively, the individual short rhythms could be stored at plural locations in the memories in accordance with the desired frequency of their occurrence.

The absolute time interval of the ON/OFF times is determined by the duration of the individual measure which usually may be continuously varied by the player. The signal commensurate with the selected measure duration is delivered from rhythm generator 16 as the "metronome clock" to a control logic circuit 36. Control logic circuit 36, which may comprise gate array logic, generates the relevant temporal control signals in response to the "metronome clock". Thus control logic circuit 36 provides a control input to address generator 22 and is additionally connected to counters 38, 40 and 42. Counter 38 is the "clock" counter and has a capacity from 0–7. Counter 40 is the "semi-measure" counter and counts from 0–3. Counter 42 is the "interval" counter and counts from 0–47.

To summarize the above, the absolute value of each "time unit" can be varied by the player by means of the exercise of control over rhythm generator 16 to thereby selectively vary the "metronome clock" input to control logic circuit 36. The shortest time unit, represented by one bit, is 1/48 of one measure. The overflow output of counter 42 thus defines the duration of one measure. Referring to FIG. 2, it may be seen that the rhythm scheme varies after four semi-measures. This variation results from the generation of control signals by counter 40. The duration of "phrases", each comprising eight measures, is determined by counter 38 and, as noted above, each "phrase" is commonly treated.

FIG. 3 represents the circuitry which would be employed for a single basic rhythm. Other memories and probability or weighting circuits would be allocated for each of the other available basic rhythms while the remaining components of FIG. 3 would be commonly employed to produce the ON/OFF signals, provided at output 44, for all basic rhythms.

The pitch of the notes to be produced during the appearance of an "ON" signal on output 44 of the tone duration control is determined in the following manner.

Figure 6:
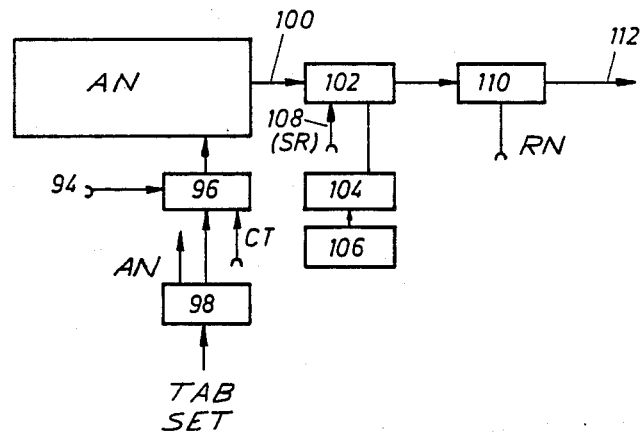
FIG. 6 is a functional block diagram of circuitry in accordance with the present invention which enables the player to transpose the command signals outputted from the circuitry of FIG. 5.

The player, in striking a chord on the lower manual 12, defines the notes, hereinafter the "allowed" notes, which will be used in the improvisation. The input to the improviser 14 will actually be a CT, i.e., "chord type", signal which is delivered to logic circuit 96 (FIG. 6). The CT signal may, for example, be generated by a circuit included in the organ as shown in U.S. Pat. No. 4,397,209. The "allowed" notes are determined from the chord type by applying musical rules. If the player strikes only one key, this key will be interpreted as a major chord with the corresponding note being the root of the chord. If the player does not depress any key, the improviser will continue to operate under the command of the most recently played note(s). If, after the instrument has been switched on, the improviser is also switched on without any key being depressed, the improvisation will be in the key of C-major.

Figure 4:
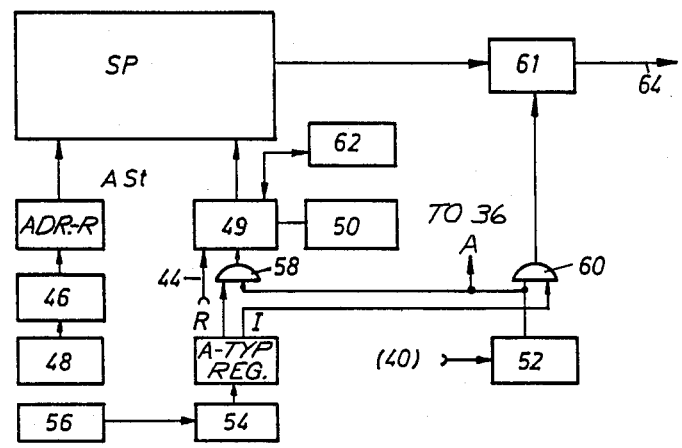
FIG. 4 is a functional block diagram of a portion of a tone pitch data generation circuit which could be employed in the embodiment of FIG. 1.

Referring to FIG. 4, the processing of the data commensurate with the note or notes inputted from the lower manual 12 will now be explained. In this explanation it will be assumed that the "allowed" notes have been stored in memory AN in an order of increasing frequency within one (1) octave. Varying melodies are produced by varying the sequential addressing of that memory.

In FIG. 4 a memory in which predetermined "short melodies" are stored, in the form of address sequences for the "sound pitch" memory AN, is indicated at SP. A random number generator 46, with associated weighting circuit 48, will generate address information which will result in the short melodies being randomly read from memory SP. The reading of short melodies from memory SP is enabled by a control logic circuit 49 which, in turn, is responsive to the appearance of an ON signal at output 44 of the tone duration control of FIG. 3. It is to be noted that the outputs of all random number or address generators are held in buffer memories until the data is overruled by new data.

The operation of the circuit of FIG. 4 will be facilitated by the following example.

Tonic: C-major

In accordance with Western musical tradition, the respectively playable notes of the evenly tempered scale are:

C-C#-D-D#-E-F-F#-G-G#-A-B-H

Of these, C, E, G and A are "admitted" notes, and the addresses 0, 1, 2 and 3 are respectively allocated to them. Different short melodies are then defined by the address sequences as, for example, (i) 1-2-3-0, (ii) 3-2, (iii) 3-0-2-1-0-2, etc.

A short melody, once elected, will have a length of two (2) measures, namely measure 0 and measure 1, and will function as a "question short memory". In the next following two measures, i.e., measures 2 and 3, this question short melody is modified in the manner to be explained below. If the short rhythm data appearing on the output 44 of the tone duration control includes more "ONs" than notes are contained in the "question short melody", the read-out of memory SP will be repeated. For example, if the short melody is 2-3-3-4, and six notes are required in two measures, the improviser will "play" 2-3-3-4-2-3. The short melodies read out during the first (0) and second (1) measures are stored in a buffer memory 50 so that they may be processed **to form "response short melodies" for the third (2) and fourth (3) measures. In actual practice, buffer memory 50 need only store the end addresses of the "notes" comprising the "question short melodies". A flip-flop circuit 52 functions as a commutator between the "question" and "response" measures.

Different types of responses are provided in the disclosed embodiment of the invention and these different responses will be randomly implemented in accordance with random numbers, produced by random number generators, which may have weighting circuits associated therewith.

The circuit illustrated in FIG. 4 has the capability of two types of response. The first of these responses is designated "reflection" (R) while the second response is designated "inversion" (I). These two types of response may be combined. During a "reflection response", the short melody stored in buffer memory 50 during measures 0 and 1 is read-out in a retrograde manner during measures 2 and 3, i.e., in the example given above the address sequence 3-2-4-3-3-2 would be generated. During an "inversion response" each individual number of the short melody is subtracted from a given constant number "k", the sequence of numbers thus formed defining the response short melody. For example:

Question Short Melody: 3 - 2 - 0 - 1 - 2
Constant k=2 results in 1 - 0 - -2 - -1 - 0 as response, negative numbers simply meaning notes of the next lower octave
Constant k=5 results in 2 - 3 - 5 - 4 - 3 as response, numbers beyond the highest one of the admitted notes simply meaning proceeding into the next higher octave.

Preferably, during an "inversion response", a fixed constant approximately in the middle of the pitch range of the admitted notes will be selected in order to avoid very abrupt interval jumps.

The election of the response type is made by a random number generator 54 in association with its associated weighting circuit 56. The output of random number generator 54 is applied to an A-type shift register and an output of the register is applied as an enabling signal either to gate 58 or gate 60. The output "A" of flip-flop 52 is also delivered to gates 58 and 60. The flip-flop 52 is in effect switched between "question" semi-measures and "response" semi-measures in response to the output of counter 40 (FIG. 3). In actual practice the control input to flip-flop 52 will be generated by control logic circuit 36 in response to the control signals outputted from counter 40.

If both inputs to gate 60 are "high", the gate will provide an enabling signal to a modification circuit 61. When circuit 61 is enabled, data read from the SP memory are modified by k minus data, i.e., the improviser is in the inversion response mode.

An address counter 62 stores the addresses of the data read from memory SP. Counter 62 is reset to 0 after the second measure or, in the case of reflection response, is loaded from buffer memory 50 and decremented in the sequence of the ON signals.

If it is desired to have a more regular improvisation, the short melody of measure 1 may be a repetition of that of measure 0, and the responses will be handled in the same manner. Counter 62 will, under this operating condition, be reset to 0 or to the last value held in buffer 50 for each new measure, depending upon the response type.

During a "phrase" of eight (8) measures, defined by the rhythm on output 44 of the tone duration control, two randomly elected short melodies are respectively processed.

It is to be understood that a short melody, once selected, may be varied in other manners in addition to the above-discussed reflection and inversion responses. Such variation will also be under the control of random number generators and associated weighting circuits.

Figure 5:
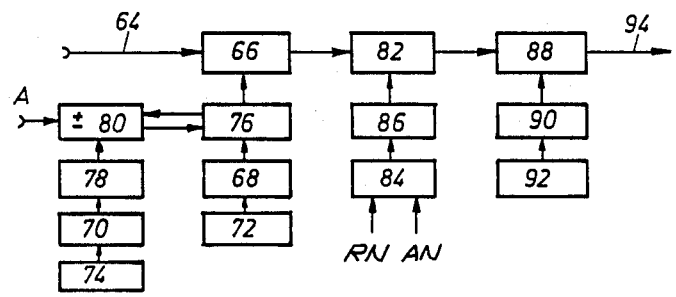
FIG. 5 is a functional block diagram of circuitry in accordance with the present invention for processing data outputted from the circuit of FIG. 4.

With reference now to FIG. 5, the output signals from the circuit of FIG. 4, applied to bus 64, are delivered to a summing circuit 66 wherein an off-set, i.e., absolute pitch shift, and/or a relative off-set may be introduced. Any such off-set will be generated under control of random number generators 68 and 70 which have, respectively associated therewith, weighting circuits 72 and 74. An addition will occur in summing circuit 66 unless the outputs of random number generators 68 and 72 are zeros.

Before each measure, the value of the absolute off-set, i.e., 0, 4, 8—, is randomly determined and written into an off-set register 76. Simultaneously, a further random number is written into a relative off-set register 78. During the read-out of the "question short melody", the absolute off-set value, i.e., the number in register 76, is added to the number in register 78 in an addition/subtraction circuit 80. Conversely, during the read-out of a "response short melody" the number in register 78 is subtracted from the number in register 76. The function, i.e., addition or subtraction, performed by circuit 80 is determined by the output signal "A" of flip-flop 52. Thus, because flip-flop 52 is controlled by semi-measure counter 40, a relative offset will occur only if the improviser is in the inversion response mode. Obviously the addition and subtraction functions can be reversed.

The data on bus 64 is delivered to a summing circuit 66 which also receives, as an input, the number in register 76. The output of summing circuit 66 is delivered to a further summing circuit 82 which produces transposition off-setting. Thus, if the player strikes another tonic, i.e., a key or chord, on the lower manual 12, the improviser will react in an adaptive manner, extreme pitch differences being avoided for musical reasons. The necessary off-set is calculated in a computing circuit 84 as a function of the number AN of admitted notes per octave and the root note RN of the newly selected tone in accordance with the formula:

$$\text{off-set} = (RN - C)\, AN/12$$

wherein (RN−C) is the number of semi-tones between the root note and the note "C". An off-set is possible by full intervals only, i.e., any fraction which results from the solving of the above equation will be rounded off in a suitable manner. The above-described events, i.e., a transposition off-setting, will occur only if RN or AN change. The value resulting from the solution of the above equation is stored in a register 86 which is connected to the summing circuit 82. The RN signal is provided by organ circuit 10 in the known manner. The AN signal is generated by a selector circuit 98 (FIG. 6).

The output of summing circuit 66, with or without transposition off-setting, is delivered to a suppression circuit 88. Suppression circuit 88 enables individual notes to be replaced by rests. Suppression circuit 88 functions under the control of a further random number generator 90 which has associated therewith a weighting circuit 92.

The output of suppression circuit 88 is delivered to a bus 94 and comprises sequential addresses of a memory AN (FIG. 6). Memory AN, as discussed above, stores the admitted notes or tones. This data is written into memory AN in the order of the note pitch (frequency) relative to tonic "C" with root note RN=C via a logic circuit 96 in accordance with the tonic or chord-type CT selected by the player. In addition, by means of a selector circuit 98, a note selection may be provided commensurate with a musical style chosen by the player, i.e., "Dixieland", "Soul", etc. Thus, selector circuit 98 is directly responsive to the selector switches, i.e., the set tabs, on the organ with which the player selects a basic rhythm. Accordingly, the data outputted from memory AN on bus 100 will determine note pitch and octave. The number AN of admitted notes, i.e., four, may be smaller than the number of different notes included in a short melody, i.e., five. Should this happen, the octave is incremented by 1 and the note pitch signal is decremented by the number AN. With the example assumed above, the resulting note pitch signal will equal 5. Subtracting AN (=4) results in a note pitch signal which equals 1 which means that the first address AN defines the pitch but it is played in the next higher octave.

Data read from memory AN on bus 100 is delivered to a pre-strike circuit 102 which decrements, for a short interval, the note pitch by one (1) semi-tone under control of a random number generator 104 and its associated weighting circuit 106. Such decrementing, however, is permitted only if the note (data) duration exceeds a predetermined minimum value. Accordingly, the pre-strike circuit 102 requires an enabling signal SR which is applied at input 108, this enabling signal being present at an output of the tone duration control logic circuit only if the absolute sound duration exceeds the minimum.

A transposing circuit 110 provides conversion of the output signal of pre-strike circuit 102 in accordance with the valid root note RN. The output 112 of transposing circuit 110 will thus comprise signals having a format exactly like those which could be generated by striking a key of the manual. Accordingly, the output of transposing circuit 112 may be delivered to the decoding circuits of the tone generating circuity of the organ.

Electronic musical instruments having percussion automatic circuitry may be provided with a plurality of improvisers in accordance with the present invention for the sounding of each selected basic rhythm. Each improviser will then be followed by differently tuned percussion sound generators. This allows use of the instrument with a given basic rhythm which is varied in a random manner but nevertheless in accordance with predetermined rules.

Figure 7:
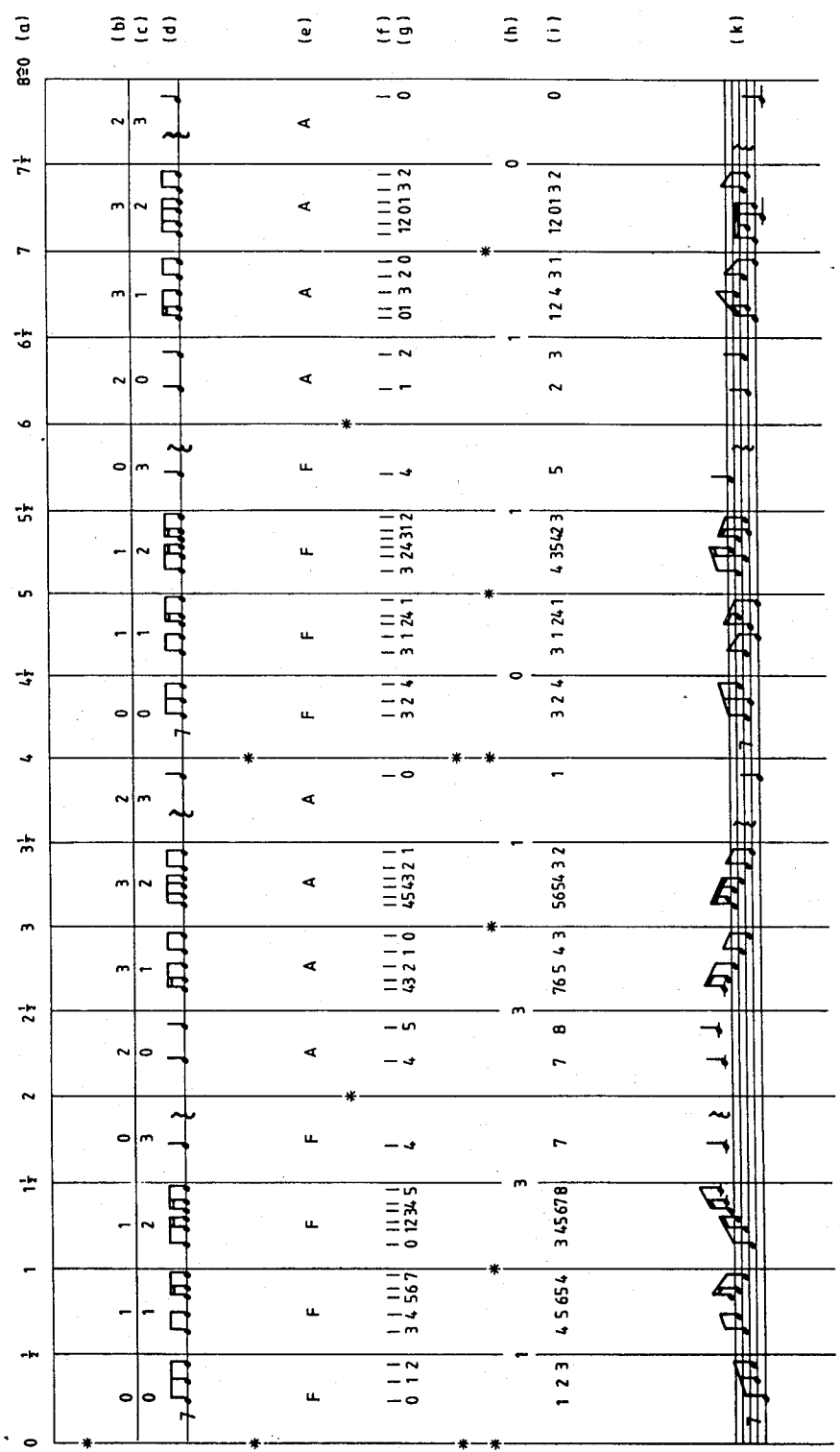
FIG. 7 is an illustration of several measures of a melody which could be produced by the circuitry of FIGS. 3-6.

FIG. 7 is a schematic illustration of a few measures of an improvised melody produced through the use of the disclosed embodiment of the present invention. In FIG. 7 the melody is illustrated in conventional musical notation together with the respective events of the digital signal processing. In FIG. 7 the various lines correspond to the following: Line (a): Time scale given in measures of melody Lines (b), (c), (d): Rhythm determination by selection of short rhythm pattern addresses ASR0, ASR1, ASR2, ASR3. Each short rhythm pattern is defined by ASR and a selected memory TSR.

Line (b): Selected addresses ASR
Line (c): Selected memory table TSR
Line (d): An example—Rock rhythm.

Lines (e), (f), (g), (h), (i): Note pitch determination. Selection of a short
  melody pattern (SP), e.g. Measure 0:
  0-1-2-3-4-5-4-3-2-1-2-0-2-1-4-1;
  Measure 4:
  3-2-4-3-1-2-4-1-2-3-4-5-4-3-2-4;
  F=Question Modus, A =Response Modus
  line (e).

The respectively admitted notes are stored in the AN memory and depend upon the played tonic. For example, C-major results in C, E, G, A as admitted notes, numbers 5 through 8 respectively relating to the same notes in the next higher octave.

On line (f), each dash marks a note to be sounded, commensurate with the rhythm illustrated on line (c).

On line (g), Measure 0 utilizes the (SP) numbers in sequence as established for this measure, and the same also applies for Measure 4. In Measures 1 and 5, respectively, the (SP) pattern is recommenced. However, due to a different number of notes to be played as established by the differing (SR), another number of notes is utilized, less in Measures 1 and 5 than in Measures 0 and 4, respectively.

For the response measures (A), several types of modifications of the question modus short melody are conceived. In the example, in Measure 2, a reflection or retrograde response type is utilized as explained above, and the same also applies to Measure 3. It is to be observed that the reading of memory AN commences with that note which was the most recently read during F-mode, and this applies to both of Measures 2 and 3.

For Measures 6 and 7, the response modification is an inversion, as defined above, with a constant of c=4.

Line (h) indicates the off-sets which are additionally applied. The absolute off-set has been selected to be equal to 1 for Measures 0 through 3 while in these Measures the relative off-set was chosen to be equal to 2. The values for the absolute and relative off-sets are respectively 0 and 1 for Measures 4 through 7. During Measures 0, 3, 4 and 7 only the absolute off-set is effective while the absolute and relative off-sets are effective in the remaining Measures.

Line (i) indicates the resulting addresses for the AN memory which holds the admitted notes.

Line (k), written in conventional musical notation, illustrates the resulting "improvised" accompaniment melodies.

It is particularly to be noted that in the example of FIG. 7 no use was made of the other melody modifications discussed above, i.e., transposition, pre-strike, etc. The melodies resulting from the use of such other modifications will be readily apparent to those skilled in the art from the above description.

While a preferred embodiment has been shown and described, various modifications and substitutions may be made thereto without departing from the spirit and scope of the invention. For example, while a plurality of random number generators have been shown, in practice a single random number generator supplying all the random numbers required in time multiplex fashion may be employed. Accordingly, it is to be understood that the present invention has been described by way of illustration and not limitation.

What is claimed is:

1. An improvisation circuit for use in an electronic musical instrument comprising:
  first memory means, said first memory means having stored therein tone duration data;

first random address generator means, said first random address generator means being coupled to said first memory means and generating address information which causes tone duration data to be read therefrom;

second memory means, said second memory means having tone pitch data stored therein;

second random address generator means, said second random address generator means being coupled to said second memory means and generating address information for causing tone pitch data to be read from said second memory means;

means responsive to the data read from said first and second memory means under the control of said address generator means for producing tone generator command signals, said command signals containing tone pitch and rhythm information;

first control signal generator means for providing a control input to said first random address generator means commensurate with a selected basic rhythm; and second control signal generator means for providing a control input to said second random address generator commensurate with a selected tonality whereby said command signals means be commensurate with variations on said selected basic rhythm and tonality.

2. The apparatus of claim 1 wherein said first memory means stores rhythm short-patterns and wherein said first address generator means includes weighting circuit means and is responsive to the control input provided by said first control signal generator means.

3. The apparatus of claim 1 wherein said second memory means comprises a melody short-pattern memory, addressable by said second address generator means, and a note memory, said note memory receiving and storing data commensurate with the selected tonality, said melody short-pattern memory sequentially addressing said note memory in response to addresses provided by said second address generator means.

4. The apparatus of claim 3 further comprising:
means for modifying the melody short-patterns read from said melody short-pattern memory.

5. The apparatus of claim 4 wherein said modifying means comprises:
means for varying the melody short-patterns in a predetermined manner; and
random number generator means, said random number generator means being connected to said means for varying and producing output signals.

6. The apparatus of claim 5 further comprising weighting circuit means associated with said random number generator means.

7. The apparatus of claim 4 wherein said modifying means is adapted to read-out said short-pattern melody with an inverted sequence of addresses.

8. The apparatus of claim 4 wherein said modifying means is adapted to modify data read from said short-pattern memory in accordance with an algebraic rule.

9. The apparatus of claim 8 wherein said melody short-pattern data read from said short-pattern memory is negated and a constant subsequently added thereto.

10. The apparatus of claim 4 wherein said modifying means algebraically adds a constant to said short-pattern read from said melody short-pattern memory and includes a random number generator providing an output signal which remains constant for the duration of a predetermined number of measures.

11. The apparatus of claim 10 wherein said modifying means performs an alternating addition of two constants to said melody short-patterns during equal predetermined numbers of measures.

12. The apparatus of claim 4 wherein said modifying means comprises:
a note skipping circuit; and
a random number generator, said random number generator being connected to said note skipping circuit and providing a control input therefor.

13. The apparatus of claim 3 further comprising:
means for off-setting data read from said melody short-pattern memory by a magnitude determined by the pitch difference between the root notes commensurate with two successively selected tonalities.

* * * * *